Oct. 16, 1951 K. C. RATHBUN 2,571,760
APPARATUS FOR FORMING COLLOIDIZED PLASTICS
Filed Dec. 30, 1947

KENNETH C. RATHBUN
INVENTOR
BY
ATTORNEYS

Patented Oct. 16, 1951

2,571,760

UNITED STATES PATENT OFFICE 2,571,760

APPARATUS FOR FORMING COLLOIDIZED PLASTICS

Kenneth C. Rathbun, Clemson, S. C., assignor to Eastman Kodak Company, Rochester, N. Y., a corporation of New Jersey Application December 30, 1947, Serial No. 794,584

2 Claims. (Cl. 18—2)

1

This invention relates to apparatus for forming colloidized thermoplastic materials, and more particularly to an apparatus for forming colloidized thermoplastics which are substantially free from air bubbles.

Heretofore in forming colloidized plastic masses as from thermoplastic resins and cellulose esters such as cellulose acetate, cellulose propionate, cellulose butyrate and cellulose mixed esters such as cellulose acetate propionate and cellulose acetate butyrate, the resin or cellulose ester is suitably mixed with plasticizer and coloring or filler materials and colloidized by rolling on a pair of heated milling rolls. Typical processes for colloidizing thermoplastics on milling rolls are described and claimed in Conklin Patents 2,048,686 of July 28, 1936; 2,155,303 of April 18, 1939, and 2,319,040 of May 11, 1943.

In the process described in the first two of these patents the mixture of finely divided cellulosic material and plasticizer are rolled on hot rolls to colloidize these components. The rolls are mounted in a parallel horizontal arrangement and the uncolloidized mixture is added at the upper surface of the rolls so that it falls into the bite of the rolls, the rolls turning toward each other and the mix passing down between them. The rolling action intimately mixes the plasticizer and cellulose ester materials and exerts a shearing force thereon which tends to subdivide the hot colloidized material and to produce a homogeneous, uniform composition. A bead of newly added and partially mixed material exists between the rolls and is churned over and over as it is dragged down between the rolls. At the end of the rolling treatment, the composition is collected on one roll in a layer. It is then cut off the roll and if the composition is to be employed as in injection molding, the layer is broken up and fed to a granulator and subdivided into small granules.

In the process described in the third patent, the material to be colloidized is continuously added at one end of the parallel closely spaced rolls and the thermoplastic mass works gradually around and along the rolls during which it becomes thoroughly colloidized, and a narrow relatively thin strip of the colloidized plastic mass is continuously removed from the opposite end of one of the rolls which, because it is maintained at a temperature above that of the other roll, attracts the mass to it. As the colloidized mass progresses from the hopper along the rolls to the take-off point the rolling action also causes a bead of material to exist above the bite of the rolls. This bead churns over and over on itself some new material being added to it and part of it being drawn down between the rolls and around the rolls. The narrow, thin strip which is removed from the rolls is then positively cooled somewhat and is sliced lengthwise and is then cut while still in a semi-plastic state into very short uniform lengths thereby producing particles of the plastic composition of substantially uniform dimensions. Because the strip is relatively plastic while being cut, substantially all of the composition is made into usable particles without any "fines" normally produced by the shattering action of the granulation. These particles may be employed in extrusion and injection molding.

It was found that from time to time particularly when extruding transparent granules or particles into thin transparent sections and sheets, the transparency of the sheet was marred by the presence of air bubbles.

On investigation it was determined that when plasticized powder is put on the milling rolls, a great amount of air is trapped in the powder. Air is also occluded if dried plastic pellets are used instead of powder, as when rerolling pellets for any desired purpose. Consequently thousands of air bubbles are formed in the initial milling action and although most of them become worked out during milling, from time to time, some air bubbles are found in the product.

An object of the invention is an improved apparatus for forming colloidized thermoplastics without introducing air or gases therein.

In accordance with the invention this and other objects are attained by apparatus whereby the size of the bead which exists above and along the bite of the milling rolls is continuously controlled. In general, the bead size, by which is meant the amount of material present in the bead, is controlled in accordance with my invention so as to be smaller than the bead formed in the case where the equivalent amount of material is added to the rolls in a more or less uncontrolled manner as shown in the above-mentioned patents.

As is apparent from the drawings, the invention contemplates employing two bead sizes during the milling operation. The initial larger bead is located on the rolls at the input section and the small bead, which aids primarily in eliminating air bubbles, is located along the remaining and major length of the rolls. The size of the large bead depends more upon the amount of material being added to the rolls whereas the size of the small bead depends primarily upon the metering action of the bead control member 15. In the operation of the device it is desirable that the small bead be ½ to ¼ as large as the large bead which large bead is generally representative of the bead size existing on the rolls when not employing my novel bead size control member.

The small bead does not occlude air since there is not enough material in it to lap over on itself and entrap air as in the case of the large bead. Furthermore since the bead is relatively small the material in it receives much more milling per unit of time. The length of the small bead, as well as the length of the large bead, may be regulated by positioning the bead size control member at various points along the length of the rolls, it being adapted to be so adjusted. This regulation of bead length may be desirable when different types of plastics are to be made into sheets.

By maintaining a small bead of plastic on the milling rolls, more milling is accomplished in a given amount of time than would be possible with a large bead. Thus, for example, if 30 pounds of thermoplastic were present on milling rolls each pound would be squeezed in the bite twice as often as a quantity of 60 pounds. Since a large amount of the bubbles present in the composition on the rolls show up in the finished product the desirability of employing a small bead is apparent. However, if when using equipment in the above described patents one attempts to maintain a small bead which will effectively reduce the bubbles by reducing the amount of plastic added to the rolls, the amount added is often insufficient to keep up a continuous feed to the take-up knife and the apparatus cannot be run economically or at full capacity.

The invention will be further understood from the following detailed description with reference to the attached drawings in which.

The present invention, for convenience of discussion and illustration is described with particular reference to cellulose acetate plastics, but the apparatus is equally applicable to the continuous production of improved plastic products having substantially no occluded air therein from any of the other various cellulose organic derivatives such as cellulose propionate, cellulose butyrate, cellulose acetate propionate, cellulose acetate butyrate, methyl ether, ethyl ether, benzyl ether, and the like, as well as the thermoplastic resins such as acetal resins and others known to the art.

The initial step of preparing the molding composition is the mixing in a suitable mixer of an appropriate amount of the finely divided cellulose acetate with a compatible plasticizer such as tripropionin and any other additions such as dyes, pigments, pearl essence or other nacreous forming material fillers and the like which may be desired.

While various types of mixers may be employed, one may employ the type of mixer and, if applicable, the method described in Palmer Patent No. 2,150,939 of March 21, 1939.

Figure 1:
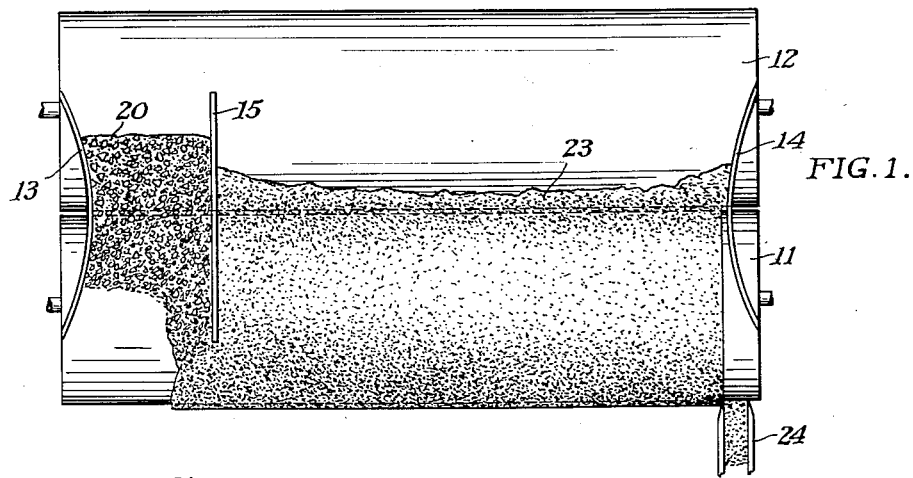
Fig. 1 is a plan view of the apparatus of my invention having a thermoplastic material thereon as in process operation.
Figure 2:
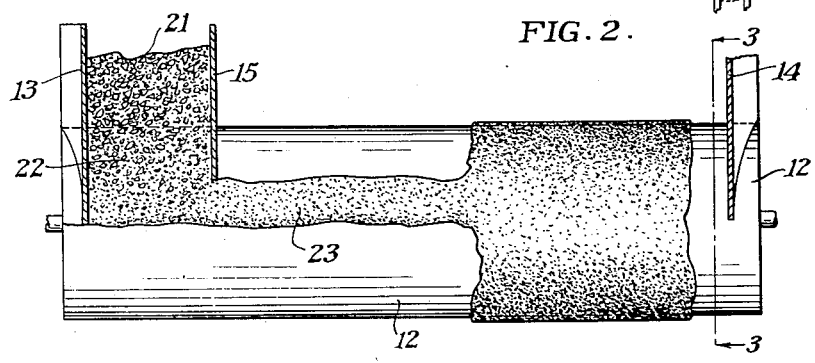
Fig. 2 is an elevational view of the apparatus, part of which is in section, more clearly showing the member for controlling the bead size.
Figure 3:
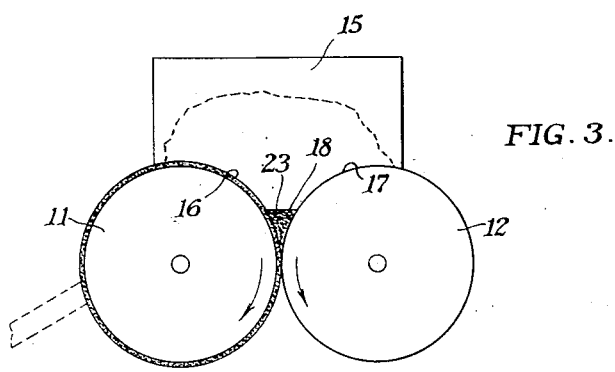
Fig. 3 is a cross sectional view taken on the lines 3—3 of Fig. 2 showing the bead size control member and its relationship to the rolls.

The apparatus of the present invention will be more clearly understood by referring to Figs. 1 and 2 which show apparatus comprising a pair of rotatably mounted rolls, front roll 11 and back roll 12 adapted to turn in opposite directions as shown by the arrows in Fig. 3. A pair of end plates 13 and 14 are placed above the rolls and have arcuate sections, not shown, closely fitted to the peripheral surface of the respective rolls whereby no plastic material will pass thereunder. A material metering member 15 which may also be called the bead size regulating member is also positioned above the pair of rolls and is adapted by means not shown to be lowered and raised in a vertical plane in respect to the rolls. As shown in Fig. 3, member 15 has arcuate sections 16 and 17 which are concentric with the periphery of rolls 11 and 12. Member 15 is also adapted to be positioned at different points along the length of the rolls.

A metering space 18 is formed between the apex of member 15 and the bite of the rolls 11 and 12, as is more clearly shown in Fig. 2. This arrangement permits a restricted and predetermined amount of uncolloidized plastic to flow through the metering space.

The operation of this apparatus will be more clearly understood by reference to Figs. 1 and 2 when it is apparent that uncolloidized plastic 20 is continuously added by means not shown to the space 21 defined by members 13 and 15. As this material passes through the bite of the heated rolls, a large bead 22 will be formed on the rolls above which uncolloidized plastic will rest and which will gradually work into the bead. The addition of more uncolloidized plastic will soon cause some of the colloidized plastic to be squeezed through space 18 and work along and around the hot front roll 11 to the opposite end where it is continuously removed by the stripping knife 24.

Because the flow of partially colloidized plastic is from the large bead through the metering space 18, the small bead 23 is maintained within predetermined limits which causes the plastic to be more thoroughly mixed, heated and colloidized. This action squeezes out substantially all of the air which may have been occluded in the mixture and therefore the strip of plastic 25 being removed from the knife 24 is substantially free of air bubbles.

This strip 25 may be made into pellets by the method shown in Patent 2,319,040, or otherwise processed as by being calendered into strips or sheets of desired dimensions. In any event these products will contain substantially no air bubbles, being made from the air bubble free product of my present invention.

The rolls 11 and 12 are internally heated by any suitable method known to the art, and roll 11 is heated higher than roll 12 so that the plastic material will collect thereon. The heating fluid is often introduced in such rolls through their shafts as is well known in this art. The hot roll may be at 370° F. and the cooler roll at 250° F. One or both rolls may be driven by a prime mover not shown.

While in the above-described drawings the thermoplastic mixture is shown being added at one end of the rolls and being removed in a colloidized strip at the other end, by employing another bead control member relatively positioned at the opposite end of the roll, plastic could be added at both ends of the rolls and removed at a mid point of the rolls.

While the process is illustrated by employing as an example of a thermoplastic composition one composed of cellulose acetate and tripropionin, as above suggested, the process is applicable to various other thermoplastic compositions some of which are shown in the following examples:

*Example I*

| | Parts |
|---|---|
| Cellulose acetate | 100 |
| Dimethyl phthalate | 35 |

*Example II*

| | |
|---|---|
| Cellulose acetate propionate | 100 |
| Dimethyl phthalate | 35 |

*Example III*

| | |
|---|---|
| Cellulose propionate | 100 |
| Dibutyl phthalate | 40 |

*Example IV*

| | |
|---|---|
| Cellulose acetate butyrate | 100 |
| Diamyl phthalate | 30 |

*Example V*

| | |
|---|---|
| Cellulose acetate butyrate | 100 |
| Dibutyl phthalate | 20 |

These formulae can be mixed in a suitable mixer and added to the hopper of the rolling apparatus as is apparent from the above description.

Although the above description has been with respect to processing to an extent for obtaining elimination of air bubbles as fully set forth, it is apparent that the principles of the invention may also be used for obtaining partial elimination of air bubbles or improved mixing and processing.

I claim:

1. An apparatus for milling plastic material comprising a pair of parallel, horizontally positioned, closely spaced milling rolls, material retaining means positioned adjacent the respective ends of the rolls adapted to retain material being rolled on the rolls between said retaining means, and means positioned above and adjacent the rolls for restricting axial flow of substantially all of the material initially supplied to the upper surfaces of the rolls to a zone at one end thereof, said means in cooperation with adjacent downwardly converging roll surfaces defining an aperture adjacent the bight of the rolls adapted to permit axial movement of material from said zone along the axis of the rolls, said rolls only being rotatable to draw the material downwardly through the bight of the rolls.

2. An apparatus comprising a pair of parallel positioned rolls, material retaining members positioned adjacent the respective ends of the rolls at right angles to the major axes thereof, each of said members having arcuate sections fitted closely to the respective upper peripheral surfaces of the rolls to retain material being worked on the rolls to the space between the retaining members, a regulating member positioned above the rolls and intermediate said retaining members, and positioned at right angles to the major axes of the rolls thereby separating the surface of the rolls into two zones, and also having arcuate sections fitted closely to the respective upper peripheral surfaces of the rolls and having a portion adjacent the convergence of the rolls but spaced therefrom to provide a control slot through which a portion of plastic material added to the rolls at one side of the regulating member may flow axially along the convergence of the rolls to the opposite side, said rolls only being capable of rotating to draw the material downwardly through the bight of the rolls, the zone where material is added being of less axial extent than the other zone.

KENNETH C. RATHBUN.

REFERENCES CITED

The following references are of record in the file of this patent:

UNITED STATES PATENTS

| Number | Name | Date |
|---|---|---|
| 2,155,303 | Conklin | Apr. 18, 1939 |
| 2,177,612 | Schnabel | Oct. 24, 1939 |
| 2,314,062 | Alvey et al. | Mar. 16, 1943 |
| 2,316,283 | Piperoux et al. | Apr. 13, 1943 |
| 2,319,040 | Conklin | May 11, 1943 |
| 2,341,651 | Raschig | Feb. 15, 1944 |
| 2,434,707 | Marshall | Jan. 20, 1948 |
| 2,438,281 | Gordon | Mar. 23, 1948 |